Feb. 7, 1950　　　H. M. BARTON, JR　　　2,496,338
DETONATION INDICATOR CIRCUIT AND METHOD
Filed Jan. 18, 1945　　　　　　　　　　　　2 Sheets-Sheet 1

INVENTOR.
Hugh M. Barton Jr.
BY
Darby & Darby
Att'ys.

INVENTOR.
Hugh M. Barton, Jr.
BY Darby & Darby
Att'ys.

Patented Feb. 7, 1950

2,496,338

UNITED STATES PATENT OFFICE 2,496,338

DETONATION INDICATOR CIRCUIT AND METHOD

Hugh M. Barton, Jr., Bartlesville, Okla., assignor to Phillips Petroleum Company, a corporation of Delaware Application January 18, 1945, Serial No. 573,389

8 Claims. (Cl. 73—35)

A general object of this invention is to provide an apparatus and method to stabilize the indicating pointer of a voltmeter when energized by a current of fluctuating potential.

Another object of this invention is to indicate the sum of "$n$" peak detonations on a steady reading voltmeter.

This invention has to do with improvements in vacuum tube voltmeter circuits as adapted, for example, for use in indicating the intensity and other characteristics of "knocking" detonations in the cylinders of internal combustion engines.

From a more concrete approach, an object of this invention is to improve the operation of the detonation meter disclosed in the copending application of my coworker Deslonde R. de Boisblanc, Serial No. 524,502, filed February 29, 1944.

Other and more detailed objects of the invention will be apparent from the following detailed description of one embodiment thereof as described below in connection with the attached drawings.

This invention resides in the combination, construction, arrangement and relative location of parts, steps and series of steps, as will be described in detail below.

Figure 1:
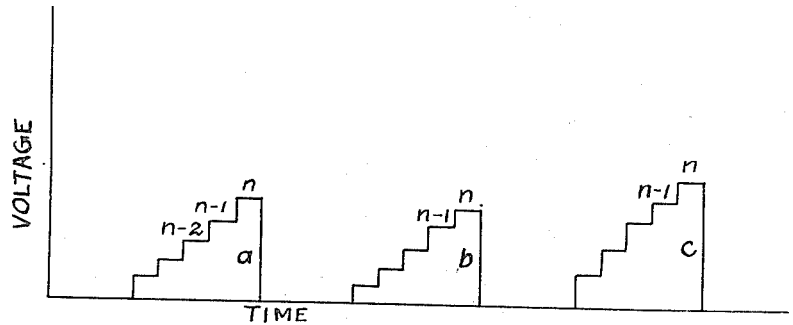
Figure 2:
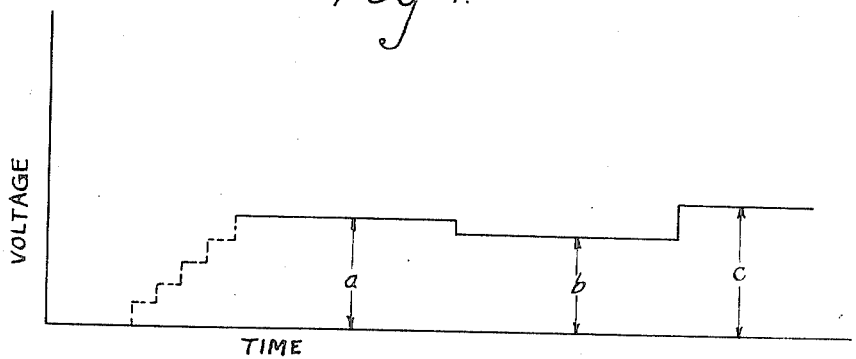
Figure 3:
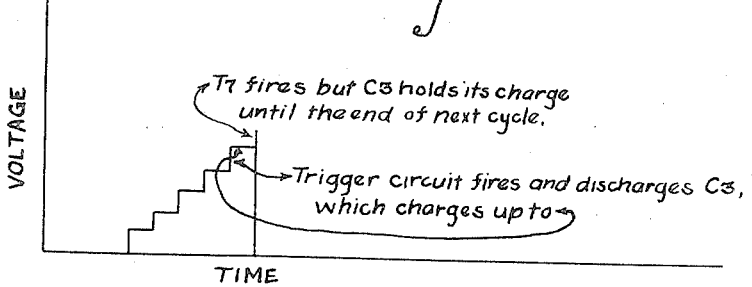
Figure 4:
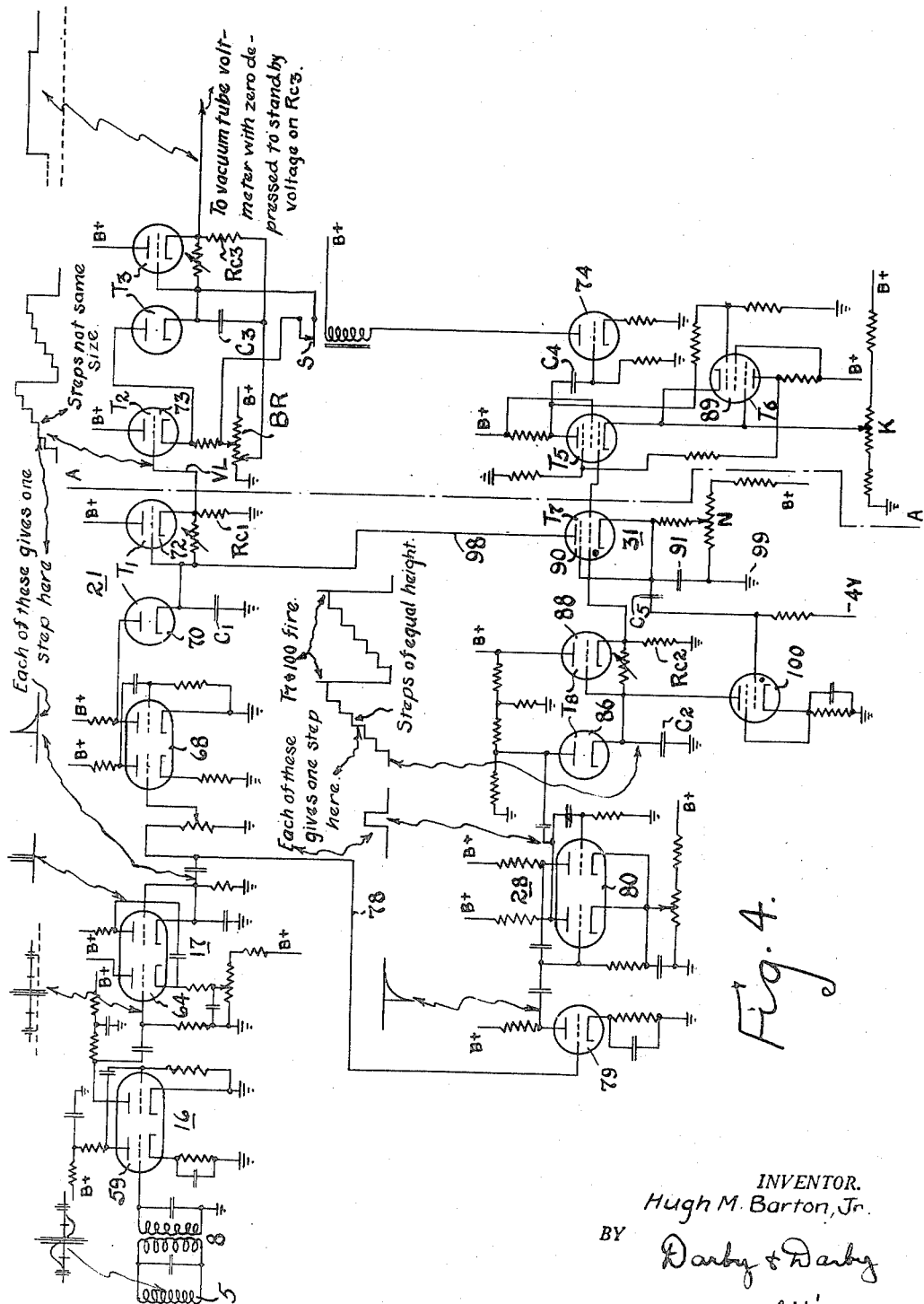

In the accompanying drawings,

Figures 1 and 2 are charts of voltage fluctuations with respect to time of generated pulses representative of the arithmetic sum of $n$ integrated "knocking" detonations in the cylinder of an internal combustion engine without and with the invention herein, respectively;

Figure 3 is a voltage chart against time descriptively illustrating the manner of operation of the circuit of this invention; and Figure 4 is a diagrammatic illustration of a complete detonation meter circuit such as that disclosed in the above mentioned copending application as modified by the inclusion of the subject matter of this invention; the apparatus to the left of the broken line A—A being substantially that of the above mentioned pending application, and that to the right comprising the invention of this application.

Before going into the details of the circuit herein disclosed, it may be noted that the apparatus to the left of the broken line A—A differs in minor respects from the corresponding portion of the above mentioned application although these differences do not result in any different function for that portion of the circuit. These differences represent minor refinements that have been added to show the actual circuit at the time of filing this application. It is to be understood, of course, that similar circuits may be employed as indicated, for example, by these differences without departing from the novel subject matter herein disclosed.

Mentioning the differences specifically, it can be noted upon comparison that the second grid of tube 90 is directly connected to its cathode, whereas in the previous application this connection includes a resistor. In this application the resistor $R_{c2}$ is shown as a fixed resistor and the resistor between the cathode and grid of tube 88 is shown as variable, whereas the corresponding resistors of the above mentioned application are both shown as fixed resistors. In the above mentioned application the resistor correspondng to $R_{c2}$ in this case has a potentiometer tapped to the grid circuit of the gas tube to control the firing thereof, whereas this firing is regulated in this application by the adjustment of potentiometer N in the cathode circuit. Finally, the resistor between the grid and cathode of tube 72 in this application is shown as adjustable while the corresponding resistor of the above mentioned application is shown as fixed.

As stated above a broad function of the invention herein disclosed is to indicate the sum of "$n$" peak detonations on a steady reading meter. The improvement disclosed is of special application to the detonation indicator circuit disclosed in the above mentioned copending application. The reading of the voltmeter in that circuit when plotted against time or the voltage fluctuations which are applied to the meter are indicated in Figure 1 herein. As those familiar with the phenomenon of engine knocking will recognize "knocking" detonations do not usually occur on every cycle of operation of the engine but appear at random, although synchronized in phase with the engine. It is now an accepted theory in the art that "knocking" is due to the generation in the cylinder or cylinders of an internal combustion engine of extremely high pressure waves of short time duration. These high pressure waves may be applied to a suitable circuit such as that of the above mentioned application, integrated and added in groups of $n$ pulses such that these groups of pulses may be shown as in Figure 1. Thus, the phenomenon of "knocking" is manifest in such a circuit as groups of voltage fluctuations which are incrementally built up in steps proportional to the intensity of the individual knock to a peak value and then are removed to start over on a new group of $n$ pulses.

Obviously a voltage fluctuating as indicated in Figure 1 will cause the meter indicator to jump about violently, which is undesirable in some cases and, therefore, in accordance with this invention, means is provided in the above mentioned circuit which will read only the peak values of each voltage train, holding each peak value indication until the peak value of the next group of fluctuations or next wave train is reached, as indicated in Figure 2. When the voltage reaches the peak $a$ in group 1 the circuit holds that voltage so that the meter indicator remains steady until the beginning of the peak detonation of the next group. As illustrated, this peak value is represented by the reference character $b$ and, being of lower intensity, the meter indicator drops as indicated in Figure 2, and holds that value until the beginning of the next peak value $c$ which, being of greater intensity than the preceding peaks, rises to a corresponding level and holds it as before. Thus the meter indicator instead of fluctuating for all voltage changes in each group only shifts its position at the beginning of the peak voltage of each group i. e., each voltage train. If the engine is running smoothly then $a=b=c$ and the meter will read steady.

It is seen from the above that the required circuit must, to use a simile, remember the voltage value $a$ until $b$ is reached at which time the memory of $a$ is removed and $b$ is remembered until $c$ is reached and so on, for successive trains of detonations.

If the engine is running at all smoothly, the $(n-1)$th detonation of group 2 is probably not much greater than the $n$th detonation in group 1. If a condenser or "memory" integrator is connected to the "adding" integrator circuit in the previously described detonation indicator through a diode, it will take on voltages larger but not smaller in value. Thus on the first group of detonations arriving, the meter will read the same as group 1 in Figure 1, that is the dotted line of Figure 2. Due to the presence of the diode, though, it will hold that voltage after the $(n+1)$th detonation has discharged the "adding" integrator. Then when the voltage of group 2 exceeds that of $a$ the "memory" integrator will assume the new value. However, if that voltage value is lower as it is in group 2 shown, it will not take on a lower voltage, hence it is necessary to momentarily discharge the "memory" integrator at the beginning of each $n$th detonation so that it may assume the value of the new $n$th detonation. In accordance with this invention, this is accomplished by the use of the "counting" integrator circuit, in the previously described detonation indicator. A trigger circuit is so adjusted that it fires at the beginning of the $n$th detonation or one less than the gas tube which discharges the "adding" and "counting" integrators. This trigger circuit operates a relay which momentarily discharges the "memory" integrator. This discharge is effected sufficiently fast so as not to show up on the indicating meter.

In order to insure a complete disclosure herein a brief description of the related portions of the detonation meter circuit disclosed in the above mentioned copending application will be described followed by a description of the improvement of this invention and the manner in which the two cooperate to produce the objects and functions of this invention.

Referring to Figure 4, the pick-up 5 which as is well known, is a pressure sensitive device, transforms the pressure variations within an engine cylinder to corresponding voltage pulses which are fed to the tuned transformer coupling comprising a band pass filter 8, the output of which is fed to the amplifier 16, comprising a duo-triode 59 and associated circuits. The output of this amplifier is applied to the pulser 17 which comprises the duo-triode 64. A positive bias is applied to the cathode of the first triode of 64 to cut out high frequency components which are present due to the clatter of the intake valve closing and the closing of the exhaust valve of the engine and which are of smaller amplitude than the detonation wave. The detonation wave is amplified and passed through the pulser 17 so that, in the output thereof, there appears a corresponding single pulse which decays exponentially as described in greater detail in the above mentioned application, but which will be clear to those skilled in the art through a study of the pulser circuit, herein. These pulses are applied to the accumulator 21 through an amplifier comprising a duo-triode 68 and associated circuits.

The pulses at the output of 17 are also fed through wire 78 into the rectangular pulse generator 28, preceded by the triode 79 acting as an amplifier, comprising the duo-triode 80 and circuits connected to provide a multivibrator. Thus for each pulse produced at the output of 17 there is generated a rectangular pulse at the output of 28, all of which are of constant amplitude and duration. The triode 79 in addition to acting as an amplifier, couples the pulser 17 to the multivibrator 28 without feedback. The grid of the first triode of 80 is negatively biased beyond cut off. The positive pulse coming from 17 overcomes this negative bias, and, regardless of the intensity of the pulse coming from 17, a rectangular pulse appears in the output of 28 of constant amplitude and duration. These pulses are supplied to the rectifying diode 86 and accumulated on condenser C2.

The counter and discharger 31 consists of the tubes 86, 88, 90 and 100, and related circuits including condensers C2 and 91. As disclosed in the above mentioned case, the pulses are accumulated in condenser C2, and the triode 88 with connected circuits compensates for any leakage from the condenser C2 in the same manner as triode 72 compensates for leakage from the condenser C1, as will be described later. The potentiometer network N can be adjusted to predetermine the number of pulses which must be applied to condenser C2 to fire the thyratron tube 90. The number of pulses on condenser C2 required to render the thyratron 90 conductive is referred to as $n+1$ which may be any positive integer from 2 upwards, although it is preferably 5 or 6.

Returning now to the accumulator 21 it includes, as indicated in Figure 4, the rectifying diode 70 having its cathode connected to ground through the condenser C1 and the compensating and regulating circuit embodying the triode 72 and associated circuits. As the time between the pulses is sometimes several seconds, some leakage from condenser C1 would occur resulting in a false reading. To prevent this, the compensating and regulating circuit is employed so that sufficient current flows into C1 from the compensator to replace any charge lost by leakage, so that the voltage across C1 is substantially constant between pulses. In the above mentioned application the vacuum tube voltmeter is connected to the lead VL at the top of resistor Rc1.

In accordance with this invention the voltage from Rc1 is fed to the grid of the triode 73 acting as a buffer tube. The cathode return of triode 73 is positively biased by potentiometer BR up to the standby voltage of Rc1 plus a bias sufficient to prevent its grid from ever going positive with respect to the cathode return. In this way operations performed on the cathode resistor of tube 73 do not reflect back on Rc1.

When tube 90 fires the charge on condenser C1 drains off through the connection 98 and tube 90 to ground at 99. A portion of this charge is applied to condenser C5 which fires the thyratron 100 and discharges condenser C2 to ground. The charge on condenser 91 discharges through the resistor shunted around it. The function of condenser 91 is to prevent the voltage on C1 from falling very far below the standby value which is set by the plate voltage of the latter section of 68.

As illustrated in Figure 4, the tube combinations T1, T8, T7 and 100 are part of the detonation meter circuit of the above mentioned case. T1 and associated circuits is the "adding" integrator and T8 and associated circuits is the "counting" integrator. In the circuit, as illustrated in Figure 4, the voltage from Rc1 is fed to a resistor-condenser compensating circuit through the buffer triode T3. The "memory" integrator circuit includes the diode and triode T3. The capacitor C3 is in the cathode circuit of the diode and the resistor Rc3 is in the cathode circuit of the triode.

The voltage from Rc2 is fed as shown to the control grids of T7 and T5. T5 and T6 are part of a Huntoon-Strohmeyer trigger circuit (disclosed in Review of Scientific Instruments 12, No. 1, 35–36, Jan. 1941) which is set by means of the K control potentiometer to fire at one pulse less than the one which fires T7. When this trigger circuits fires, a pulse is transmitted to the triode 74 shutting it off momentarily and allowing the contacts S of a relay in the plate circuit of 74 to close for a time determined by the time constant of capacitor C4 and the characteristics of the relay. The closing of the contacts S connects the capacitor C3 to the potential level of the cathode return of tube 73 by connecting into the cathode circuit of the diode of T3 for an instant, at the beginning of the last stepwise pulse from Rc2. Thus it will be seen that the "memory" integrator T3 is discharged down to standby voltage at the beginning of the $n$th detonation or one less detonation than that required to discharge the "adding" integrator T1 and the "counting" integrator T8. The energization of the trigger circuit which discharges the "memory" integrator at the beginning of the $n$th detonation operates the relay which momentarily discharges the "memory" integrator T3 by shorting C3 so that the "memory" integrator can assume the new peak voltage charge of the succeeding group of detonations whether it be higher or lower than the peak voltage of the preceding group of detonations. Condenser C5 is merely a small coupling condenser and discharges quickly to ground through 99 by way of the cathode return of tube 90 and grid return of tube 100.

An indicating electronic voltmeter of standard design with suppressed zero is connected to the lead at the top of Rc3, as indicated in Figure 4.

Figure 3 diagrammatically illustrates the operation of the system in accordance with this invention. When T7 fires at the $(n+1)$th detonation C3 holds its charge until the end of the next cycle. Prior thereto, however, the trigger circuit T5 has fired and discharges condenser C3 of the "memory" integrator which then charges back up to the value of the $n$th detonation.

From the above description it will be apparent to those skilled in the art that the subject matter of this invention is capable of embodiment in other physical forms with a wide range of variations in the details thereof, and I do not, therefore, desire to be limited by the disclosure given herein in an illustrative sense, but rather to the scope of the claims granted me.

What is claimed is:

1. A method of prolonging the peak value of each group of a series of intermittent groups of voltage fluctuations until the beginning of the peak value of the succeeding group, each group comprising a series of "$n$" pulses of varying amplitudes added stepwise to a peak value where each $n$th pulse results in a peak value of each group, comprising the steps of accumulating the pulses of each group in a first and a second condenser, generating in corresponding groups "$n$" square wave pulses of constant amplitude and duration, accumulating said square wave pulses in a third condenser, discharging said second condenser on and by the application of the $(n-1)$th pulse of each group to said third condenser, recharging said second condenser to the peak value of each succeeding group from said first condenser and discharging the first and third condensers on and by the application of the $n$th pulse of each group to said third condenser, whereby the voltage on said second condenser is maintained at the peak value of each group until the beginning of the $n$th pulse of the succeeding group, the value of which it then assumes.

2. A detonation meter for indicating the intensity of knocking synchronous with the power stroke cycle in the cycles of an internal combustion engine cylinder, comprising in combination pick-up means for continuously generating signals in groups of "$n$" pulses proportional to the intensity of knocking during the power stroke cycle, means for obtaining the indication of the sum of "$n$" signal values only and means to hold each such indication until the beginning of the $n$th signal of the next sum of "$n$" signal values.

3. A detonation meter for indicating the intensity of knocking synchronous with the power stroke cycle of an internal combustion engine, comprising in combination means for generating and transmitting signals in intermittent groups each of "$n$" pulses of varying amplitude added stepwise to a peak value where each $n$th pulse results in a peak value for its group, means for translating each such peak value into a sensible indication, and means for maintaining said indicator energized until the beginning of the $n$th pulse of the succeeding group whereby it indicates peak value of each group only.

4. A detonation meter for indicating the intensity of knocking synchronous with the power stroke cycle of an internal combustion engine, comprising in combination means for generating and transmitting signals in intermittent groups each of "$n$" pulses of varying amplitude added stepwise to a peak value where each $n$th pulse results in a peak value for its group, means for translating the sum of "$n$" pulses into a sensible indication, and means for stabilizing the operation of said indicator whereby it indicates the peak values of each group only and holds such indication until the beginning of the $n$th pulse of the succeeding peak value even if of a lower value than the $n$th pulse of the preceding group.

5. A detonation indicator for a cylinder of an internal combustion engine comprising in combination means for generating electrical signals representative of knocking conditions in said cylinder, said signals occurring in groups of $n$ pulses, means for amplifying said signals, means controlled by said signals for generating corresponding rectangular pulses of constant amplitude and duration, means for successively accumulating each group of said signal pulses, means for indicating the peak value of each signal pulse group, and means controlled by said rectangular pulses for causing the indicator to indicate each peak value until the beginning of the $n$th pulse of the succeeding signal group.

6. A detonation meter for indicating the intensity of knocking synchronous with the power stroke of an internal combustion engine comprising, in combination, means for generating electrical pulses proportional to the intensity of knocking in succeeding groups of "$n$" pulses each of varying amplitude where the sum of the amplitudes of $n$ pulses represents a final value for its group, first and second means for storing said pulses, means controlled by said pulses for generating in corresponding groups "$n$" square wave pulses of uniform amplitude and duration, a third means for storing said square wave pulses, means controlled by said third storing means for discharging said second storing means on the application of the $(n-1)$th pulse of each group, said first storing means then recharging said second storing means to said final value, means controlled by said third storing means for discharging said first and third storing means upon the application of the $n$th pulse of each group, and means for indicating the charge on said second storing means, whereby said indicating means indicates the peak value of each group until the beginning of the $n$th pulse of the succeeding group.

7. In the combination of claim 6, said first, second and third storing means comprising condensers.

8. In the combination of claim 6, said first, second and third storing means comprising condensers, and means for maintaining the charge on the first condenser in the event of leakage.

HUGH M. BARTON, Jr.

REFERENCES CITED

The following references are of record in the file of this patent:

UNITED STATES PATENTS

| Number | Name | Date |
|---|---|---|
| 1,907,415 | Carpenter et al. | May 2, 1933 |
| 2,014,102 | Conklin | Sept. 10, 1935 |
| 2,110,015 | FitzGerald | Mar. 1, 1938 |
| 2,291,045 | Lancor | July 28, 1942 |
| 2,313,666 | Peterson | Mar. 9, 1943 |
| 2,340,714 | Traver et al. | Feb. 1, 1944 |